(12) United States Patent
Tanizawa et al.

(10) Patent No.: US 9,893,884 B2
(45) Date of Patent: Feb. 13, 2018

(54) COMMUNICATION DEVICE, COMMUNICATION SYSTEM, AND COMMUNICATION METHOD

(71) Applicant: Kabushiki Kaisha Toshiba, Minato-ku (JP)

(72) Inventors: Yoshimichi Tanizawa, Yokohama (JP); Alex Dixon, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 14/644,790

(22) Filed: Mar. 11, 2015

(65) Prior Publication Data

US 2015/0270959 A1 Sep. 24, 2015

(30) Foreign Application Priority Data

Mar. 18, 2014 (JP) .................................. 2014-055391

(51) Int. Cl.
*H04K 1/00* (2006.01)
*H04L 9/08* (2006.01)
*H04B 10/70* (2013.01)

(52) U.S. Cl.
CPC ........... *H04L 9/0858* (2013.01); *H04B 10/70* (2013.01)

(58) Field of Classification Search
CPC ................................ H04L 9/0858; H04L 9/30
See application file for complete search history.

(56) References Cited

U.S. PATENT DOCUMENTS

2004/0190719 A1 9/2004 Lo .................................. 380/255
2007/0136012 A1* 6/2007 Miller .............. G01R 31/31709
702/67

(Continued)

FOREIGN PATENT DOCUMENTS

GB 2 405 294 A 2/2005
GB 2 430 124 A 3/2007

(Continued)

OTHER PUBLICATIONS

K.A. Patel., et al., "Coexistence of High-Bit-Rate Quantum Key Distribution and Data on Optical fiber" Physical Review X 2, 2012, pp. 041010-1-041010-8.

(Continued)

*Primary Examiner* — Kambiz Zand
*Assistant Examiner* — Suman Debnath
(74) *Attorney, Agent, or Firm* — Oblon, McClelland, Maier & Neustadt, L.L.P.

(57) ABSTRACT

According to an embodiment, a communication device is connected to another communication device through an optical communication path to generate an identical cryptographic key shared among the communication devices. The communication device includes a key sharing unit, a key distilling unit, a measuring unit, and a varying unit. The key sharing unit is configured to generate a shared bit string through quantum key distribution with the another communication device. The key distilling unit is configured to generate the cryptographic key from the shared bit string by a key distillation process. The measuring unit is configured to measure an error rate occurring in a photon string transmitted and received via a photon communication channel. The varying unit is configured to vary, based on the error rate, a communication function by applying a limitation on (Continued)

the optical data communication of an optical data communication channel or by releasing the limitation.

14 Claims, 5 Drawing Sheets

(56) References Cited

U.S. PATENT DOCUMENTS

| | | | |
|---|---|---|---|
| 2011/0019823 A1 | 1/2011 | Townsend | 380/256 |
| 2011/0126011 A1* | 5/2011 | Choi | H04L 9/0852 |
| | | | 713/168 |

FOREIGN PATENT DOCUMENTS

| | | |
|---|---|---|
| JP | 2006-129332 A | 5/2006 |
| JP | 2008-228048 A | 9/2008 |
| JP | 2009-509367 A | 3/2009 |
| JP | 2009-526474 A | 7/2009 |
| JP | 2009-194833 A | 8/2009 |
| JP | 2010-251976 A | 11/2010 |

OTHER PUBLICATIONS

K.A. Patel., "Quantum key distribution for 10 Gb/s dense wavelength division multiplexing networks" Applied Physics Letters 104, 2014, pp. 051123-1-051123-4 and Cover page.

Iris Choi, et al., "Field trial of a quantum secured 10 Gb/s DWDM transmission system over a single installed fiber" Optics Express, vol. 22, No. 19, 2014, pp. 23121-23128.

\* cited by examiner

COMMUNICATION DEVICE, COMMUNICATION SYSTEM, AND COMMUNICATION METHOD

CROSS-REFERENCE TO RELATED APPLICATION

This application is based upon and claims the benefit of priority from Japanese Patent Application No. 2014-055391, filed on Mar. 18, 2014; the entire contents of which are incorporated herein by reference.

FIELD

Embodiments described herein relate generally to a communication device, a communication system, and a communication method.

BACKGROUND

A quantum key distribution system is configured with a transmitter, a receiver, and an optical fiber link that connects the transmitter and the receiver. The transmitter transmits photons to the receiver via the optical fiber (a quantum commination channel). Then, the transmitter and the receiver exchange control information in the form of digital data with each other; and share, in a confidential fashion, bit strings serving as cryptographic keys. This technology is implemented using the technology generally referred to as quantum key distribution (QKD).

A technology has been proposed by which such a quantum key distribution system is integrated into an optical-data communication network system that performs regular optical data communication. Herein, the technology that enables transmission and reception of photons for the purpose of quantum key distribution and enables optical data communication at the same time using the same optical fiber link is referred to as a "co-existence technology". Thus, in the co-existence technology, a photon communication channel, which is used in transmitting and receiving photons, and an optical data communication channel, which is used in performing optical data communication, are implemented at the same time in the same optical fiber link. As a result, it becomes possible to reduce the cost of laying a new optical fiber required to implement the quantum key distribution system. Meanwhile, in the optical data communication channel mentioned above, not only the control information can be transferred but also the data not related to quantum key distribution can be transferred.

However, generally, the light used in the optical data communication channel has a strong optical intensity, while the light used in the photon communication channel has a weak optical intensity. For that reason, the light used in the optical data communication channel causes a noise for the photons in the photon communication channel. Because of such noise, the error rate in the photon communication channel goes on increasing, thereby making the operations of the quantum key distribution system unstable. Herein, the error rate is assumed to be the rate of occurrence of errors, from any cause, in the photon strings transmitted and received using the photon communication channel.

DETAILED DESCRIPTION

According to an embodiment, a communication device is connected to another communication device through an optical communication path to generate an identical cryptographic key shared among the communication devices. The optical communication path includes a photon communication channel for transmitting and receiving a photon string and an optical data communication channel for performing optical data communication. The communication device includes a quantum key sharing unit, a key distilling unit, a measuring unit, and a communication function varying unit. The quantum key sharing unit is configured to generate a shared bit string through quantum key distribution with the another communication device via the optical communication path. The key distilling unit is configured to generate the cryptographic key from the shared bit string by performing a key distillation process. The measuring unit is configured to measure an error rate occurring in the photon string transmitted and received via the photon communication channel. The communication function varying unit is configured to vary, based on the error rate, a communication function by applying a limitation on the optical data communication of the optical data communication channel or by releasing the limitation.

Exemplary embodiments of a receiver, a transmitter, a communication system, and a communication method according to the invention are described below in detail with reference to the accompanying drawings. In the accompanying drawings, the same constituent elements are referred to by the same reference numerals. However, the drawings are only schematic in nature, and the specific configuration should be determined by taking into account the explanation given below.

First Embodiment

Figure 1:
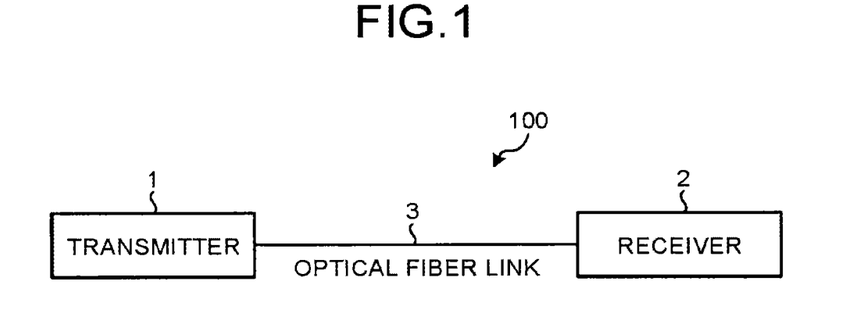
FIG. 1 is a diagram illustrating a configuration example of a communication system.

FIG. 1 is a diagram illustrating a configuration example of a communication system. With reference to FIG. 1, the explanation is given about a configuration of a communication system 100.

As illustrated in FIG. 1, the communication system 100 includes a transmitter 1, a receiver 2, and an optical fiber link 3 (an optical communication path). As illustrated in FIG. 1, the explanation is given about the communication system 100 that is configured with a single transmitter 1 and a single receiver 2. However, alternatively, it is also possible to have a communication system in which the receiver 2 has a plurality of interfaces for optical fiber communication, and a plurality of transmitters 1 is connected to the receiver 2 via the interfaces. Moreover, in this case, the transmitters 1 and the receiver 2 can have their role reversed.

In the optical fiber link 3 of the communication system 100, the wavelength division multiplex (WDM) technology is implemented so as to form a photon communication channel for the purpose of photon transmission and reception and to form an optical data communication channel for the purpose of optical data communication. Thus, the communication system 100 not only functions as a quantum key distribution system for generating cryptographic keys, but also functions as an optical-data communication network system for performing regular optical data communication. Meanwhile, for example, aside from the photon communication channel and the optical data communication channel, it is also possible to have separate channels such as a clock channel for the purpose of replacing the clock signal required in achieving synchronization between the transmitter 1 and the receiver 2.

For example, the transmitter 1 transmits, to the receiver 2 via the photon communication channel of the optical fiber link 3, a bit string (hereinafter, referred to as a photon bit string) that is made of single photons which are generated using random numbers and which serve as the basis for generating cryptographic keys. Moreover, the transmitter 1 performs a shifting process (described later), an error correction process (described later), and a key compression process (a privacy amplification process) (described later) based on the photon bit string that is transmitted; and generates a cryptographic key. Herein, the process by which the transmitter 1 transmits a photon bit string to the receiver 2 and the shifting process are particularly referred to as "quantum key distribution". Similarly, the error correction process and the key compression process (a privacy amplification process) are referred to as a "key distillation process". Furthermore, the transmitter 1 performs optical data communication with the receiver 2 via the optical data communication channel of the optical fiber link 3. Herein, the data communicated during optical data communication can be control data required in quantum key distribution or the key distillation process or can be any other commonly-used data.

The receiver 2 receives, from the transmitter 1 via the photon communication channel of the optical fiber link 3, a photon bit string that is made of single photons serving as the basis for generating cryptographic keys. Then, the receiver 2 performs a shifting process (described later), an error correction process (described later), and a key compression process (a privacy amplification process) (described later) based on the photon bit string that is received; and generates a cryptographic key that is identical to the cryptographic key generated by the transmitter 1. That is, the transmitter 1 and the receiver 2 generate and share identical cryptographic keys. Moreover, the receiver 2 performs optical data communication with the receiver 2 via the optical data communication channel of the optical fiber link 3.

As described above, the optical fiber link 3 functions as the following channels formed by implementing the WDM technology: a photon communication channel for the purpose of photon transmission and reception; and an optical data communication channel for the purpose of optical data communication.

In the communication system 100 including the transmitter 1 and the receiver 2, in case the single photons transmitted by the transmitter 1 are tapped by a wiretapper from the optical fiber link 3, the photons undergo physical changes thereby enabling the receiver 2 that has received the photons to detect that the photons have been tapped by a wiretapper. Regarding the operations by which the transmitter 1 and the receiver 2 generate a cryptographic key, the details are given later. Meanwhile, in order to collectively refer to the transmitter 1 and the receiver 2, the term "communication device" is used. Moreover, in the case in which the transmitter 1 and the receiver 2 function as a device in which photon bit strings are transmitted and received via the photon communication channel of the optical fiber link, and in which a shifting process (described later), an error correction process (described later), and a key compression process (a privacy amplification process) (described later) are performed based on the photon bit strings so as to generate cryptographic keys; the term "QKD device" is used.

Figure 2:
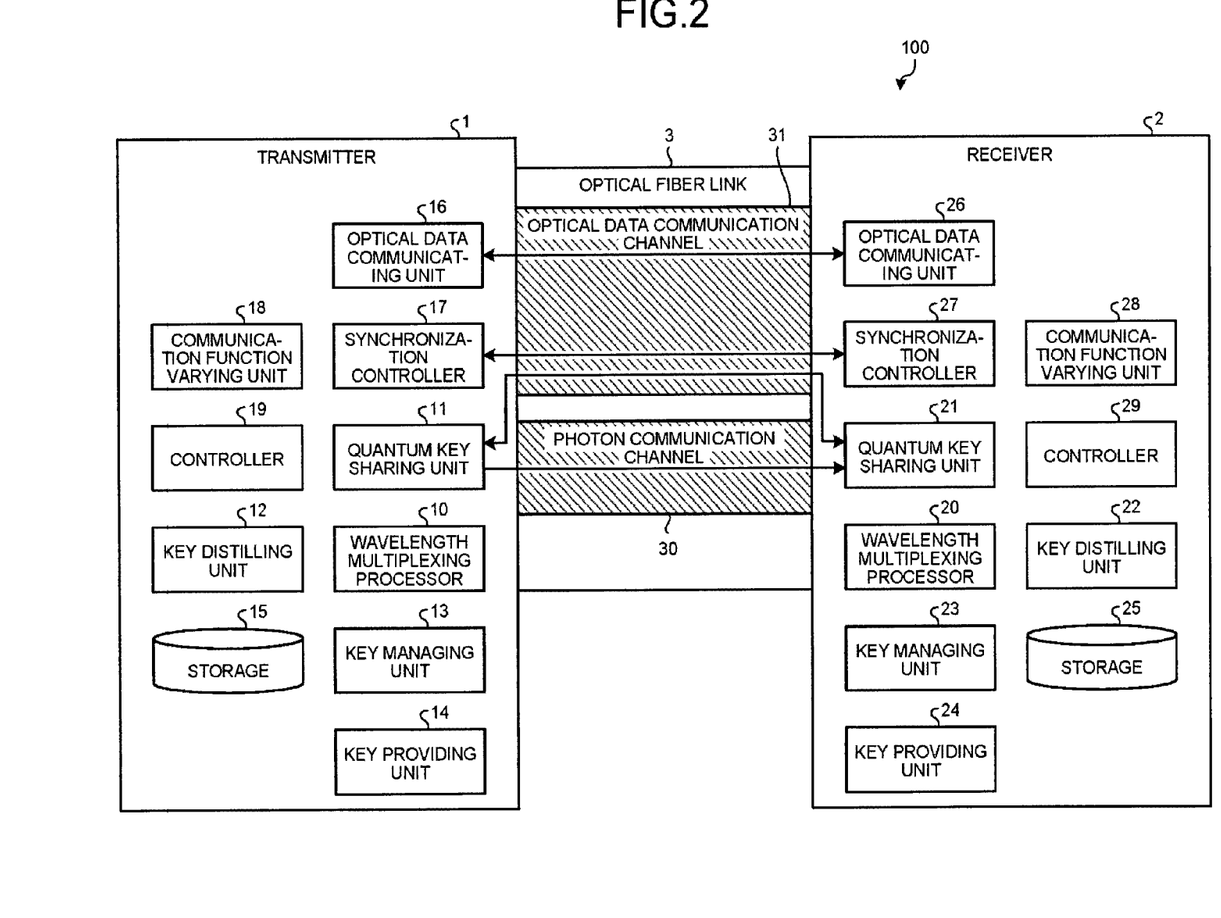
FIG. 2 is a diagram illustrating a block configuration of a transmitter and a receiver.

FIG. 2 is a diagram illustrating a block configuration of a transmitter and a receiver. With reference to FIG. 2, the explanation is given about a functional block configuration of the transmitter 1 and the receiver 2.

As illustrated in FIG. 2, the transmitter 1 includes a wavelength multiplexing processor 10, a quantum key sharing unit 11 (a quantum key sharing unit), a key distilling unit 12 (a key distilling unit), a key managing unit 13, a key providing unit 14, a storage 15, an optical data communicating unit 16, a synchronization controller 17, a communication function varying unit 18 (a communication function varying unit), and a controller 19 (a measuring unit).

The wavelength multiplexing processor 10 is a functional component that, along with a wavelength multiplexing processor 20 (described later) of the receiver 2, forms, in the optical fiber link 3, a photon communication channel 30 for the purpose of photon transmission and reception and an optical data communication channel 31 for the purpose of optical data communication.

The quantum key sharing unit 11 is a functional component that performs quantum key distribution. More particularly, the quantum key sharing unit 11 transmits, to the receiver 2 via the photon communication channel 30, a photon bit string that is made of single photons having the state based on base information generated in a random manner as against a bit string generated using random numbers. Then, the quantum key sharing unit 11 receives, via the optical data communication channel 31, base information that is generated in a random manner by the receiver 2 (a quantum key sharing unit 21 (described later)) for the purpose of reading the received photon bit strings. Subsequently, the quantum key sharing unit 11 compares the base information generated by itself with the base information received from the quantum key sharing unit 21, and performs a shifting process in which the bits corresponding to the matching portion are extracted from the photon bit string and treated as a shared bit string. The length of the shared bit string is determined based on the base information generated in a random manner by the quantum key sharing units 11 and 21. Hence, if the selection of the base information is genuinely random in nature; then, statistically, the length of the shared bit string is about half of the photon bit strings.

The key distilling unit 12 is a functional component for performing a key distillation process. More particularly, the key distilling unit 12 performs an error correction process by exchanging control data (error correction (EC) information) with a key distilling unit 22 (described later) via the optical data communication channel 31; correcting the bit errors in the shared bit string; and generating a post-correction bit string. Herein, the post-correction bit string generated by the key distilling unit 12 matches with a post-correction bit string that is generated by the key distilling unit 22 (described later) by correcting the shared bit string. Subsequently, the key distilling unit 12 receives control data (privacy amplification (PA) information) from the key distilling unit 22 via the optical data communication channel 31; and performs a key compression process with respect to the post-correction bit string with the aim of cancelling out, from the number of corrected errors, the bits that are likely to have been tapped by a wiretapper during quantum key distribution and the error correction process. Herein, the bit string that is obtained when the key distilling unit 12 performs a key compression process with respect to the post-correction bit string is called a key bit string and serves as a cryptographic key to be shared with the receiver 2.

The key managing unit 13 is a functional component that manages the cryptographic key (the key bit string), which is generated by the key distilling unit 12, by storing it in the storage 15. Moreover, besides storing the cryptographic key (the key bit string), the key managing unit 13 can store at least either the photon bit string and the shared bit string generated by the quantum key sharing unit 11 or the post-correction bit string generated by the key distilling unit 12. Then, as may be necessary, the key providing unit 14 obtains the cryptographic key from the storage 15 and provides it to an external application. The storage 15 is a storage device used in storing the cryptographic key generated by the key distilling unit 12.

The optical data communicating unit 16 is an interface device that performs optical data communication with the receiver 2 (an optical data communicating unit 26 (described later)) via the optical data communication channel 31. As described above, the data communicated during optical data communication can be control data required in quantum key distribution and the key distillation process or can be any other commonly-used data. Moreover, as described later, the optical data communicating unit 16 performs processes such as terminating and resuming the optical data communication or varying the communication throughput in response to a command received from the communication function varying unit 18. For that reason, the optical data communicating unit 16 includes a buffer (not illustrated) for buffering the data, which is to be transmitted to the receiver 2, during the termination period for optical data communication.

The synchronization controller 17 is a functional component that, while performing quantum key distribution with the receiver 2, achieves synchronization of operations between the transmitter 1 and the receiver 2. As far as the method of synchronization is concerned; for example, it is possible to make use of the optical data communication channel 31, or it is possible to form a dedicated channel for synchronization in the optical fiber link 3, or it is possible to use, for example, the global positioning system (GPS) without using the optical fiber link 3.

The communication function varying unit 18 is a functional component that controls the communication function of the optical data communication in the optical data communication channel 31. Based on the error rate of the errors occurring in the photon communication channel 30, the communication function varying unit 18 instructs the optical data communicating unit 16 to terminate or resume the optical data communication in the optical data communication channel 31. Regarding the termination condition for optical data communication, the termination period of optical data communication, and the validity period of optical data communication; the detailed explanation is given later.

The controller 19 is a functional component that controls the transmitter 1 in entirety. Moreover, the controller 19 measures, along with a controller 29, the error rate in the photon communication channel 30 and determines the method to be implemented by the communication function varying unit 18 for controlling the communication function of the optical data communication in the optical data communication channel 31. Moreover, based on the existing technology, the controller 19 can be configured to perform control (hereinafter, called feedback control) in which fiber stretchers are controlled and the polarization of light and the optical phase is varied so that the error rate is held down and stable at a low level and the quantum key distribution is maintained.

Meanwhile, the wavelength multiplexing processor 10, the quantum key sharing unit 11, the key distilling unit 12, the key managing unit 13, the key providing unit 14, the synchronization controller 17, the communication function varying unit 18, and the controller 19 can be implemented either using computer programs that are executed in a central processing unit (CPU) 80 (described later) or using hardware circuitry. Moreover, the quantum key sharing unit 11 can be implemented using a combination with a separate optical circuit device.

As illustrated in FIG. 2, the receiver 2 includes the wavelength multiplexing processor 20, the quantum key sharing unit 21 (a quantum key sharing unit), the key distilling unit 22 (a key distilling unit), a key managing unit 23, a key providing unit 24, a storage 25, the optical data communicating unit 26, a synchronization controller 27, a communication function varying unit 28 (a communication function varying unit), and the controller 29 (a measuring unit).

The wavelength multiplexing processor 20 is a functional component that, along with the wavelength multiplexing processor 10 of the transmitter 1, forms, in the optical fiber link 3, the photon communication channel 30 for the purpose of photon transmission and reception and the optical data communication channel 31 for the purpose of optical data communication.

The quantum key sharing unit 21 is a functional component that performs quantum key distribution. More particularly, the quantum key sharing unit 21 receives, from the transmitter 1 via the photon communication channel 30, a photon bit string and reads the photon bit string based on base information generated in a random manner. Then, the quantum key sharing unit 21 receives, via the optical data communication channel 31, the base information generated in a random manner by the transmitter 1 (the quantum key sharing unit 11) for the purpose of transmitting photon bit strings. Subsequently, the quantum key sharing unit 21 compares the base information generated by itself with the base information received from the quantum key sharing unit 11, and performs a shifting process in which the bits corresponding to the matching portion are extracted from the photon bit string and treated as a shared bit string. The length of the shared bit string is determined based on the base information generated in a random manner by the quantum key sharing units 11 and 21. Hence, if the selection of the base information is genuinely random in nature; then, statistically, the length of the shared bit string is about half of the photon bit strings.

The key distilling unit 22 is a functional component for performing a key distillation process. More particularly, the key distilling unit 22 performs an error correction process by exchanging control data (EC information) with the key distilling unit 12 via the optical data communication channel 31; correcting the bit errors in the shared bit string; and generating a post-correction bit string. Herein, the post-correction bit string generated by the key distilling unit 22 matches with the post-correction bit string that is generated by the key distilling unit 12 by correcting the shared bit string. Subsequently, the key distilling unit 22 generates control data (PA information) and transmits it to the key distilling unit 12 via the optical data communication channel 31; and, based on the PA information, performs a key compression process with respect to the post-correction bit string with the aim of cancelling out, from the number of corrected errors, the bits that are likely to have been tapped by a wiretapper during quantum key distribution and the error correction process. Herein, the bit string that is obtained when the key distilling unit 22 performs a key compression process with respect to the post-correction bit string is called a key bit string and serves as a cryptographic key to be shared with the transmitter 1.

The key managing unit 23 is a functional component that manages the cryptographic key (the key bit string), which is generated by the key distilling unit 22, by storing it in the storage 25. Moreover, besides storing the cryptographic key (the key bit string), the key managing unit 23 can store at least either the photon bit string and the shared bit string generated by the quantum key sharing unit 21 or the post-correction bit string generated by the key distilling unit 22. Then, as may be necessary, the key providing unit 24 obtains the cryptographic key from the storage 25 and provides it to an external application. The storage 25 is a storage device used in storing the cryptographic key generated by the key distilling unit 22.

The optical data communicating unit 26 is an interface device that performs optical data communication with the transmitter 1 (the optical data communicating unit 16) via the optical data communication channel 31. As described above, the data communicated during optical data communication can be control data required in quantum key distribution and the key distillation process or can be any other commonly-used data. Moreover, as described later, the optical data communicating unit 26 performs processes such as terminating and resuming the optical data communication or varying the communication throughput in response to a command received from the communication function varying unit 28. For that reason, the optical data communicating unit 26 includes a buffer (not illustrated) for buffering the data, which is to be transmitted to the transmitter 1, during the termination period for optical data communication.

The synchronization controller 27 is a functional component that, while performing quantum key distribution with the transmitter 1, achieves synchronization of operations between the receiver 2 and the transmitter 1. As far as the method of synchronization is concerned; for example, it is possible to make use of the optical data communication channel 31, or it is possible to form a dedicated channel for synchronization in the optical fiber link 3, or it is possible to use, for example, the global positioning system (GPS) without using the optical fiber link 3.

The communication function varying unit 28 is a functional component that controls the communication function of the optical data communication in the optical data communication channel 31. Based on the error rate of the errors occurring in the photon communication channel 30, the communication function varying unit 28 instructs the optical data communicating unit 26 to terminate or resume the optical data communication in the optical data communication channel 31. Regarding the termination condition for optical data communication, the termination period of optical data communication, and the validity period of optical data communication; the detailed explanation is given later.

The controller 29 is a functional component that controls the receiver 2 in entirety. Moreover, the controller 29 measures the error rate in the photon communication channel 30, shares the error rate with the transmitter 1, and determines the method to be implemented by the communication function varying unit 28 for controlling the communication function of the optical data communication in the optical data communication channel 31. Moreover, based on the existing technology, the controller 29 can be configured to perform control (hereinafter, called feedback control) in which fiber stretchers are controlled and the polarization of light and the optical phase is varied so that the error rate is held down and stable at a low level and the quantum key distribution is maintained.

Meanwhile, the wavelength multiplexing processor 20, the quantum key sharing unit 21, the key distilling unit 22, the key managing unit 23, the key providing unit 24, the synchronization controller 27, the communication function varying unit 28, and the controller 29 can be implemented either using computer programs that are executed in the CPU 80 (described later) or using hardware circuitry. Moreover, the quantum key sharing unit 21 can be implemented using a combination with a separate optical circuit device.

Meanwhile, the block configuration of the transmitter 1 and the receiver 2 illustrated in FIG. 2 is meant to illustrate the functions in a conceptual manner. That is, the configuration is not limited to the block configuration illustrated in FIG. 2.

Figure 3:
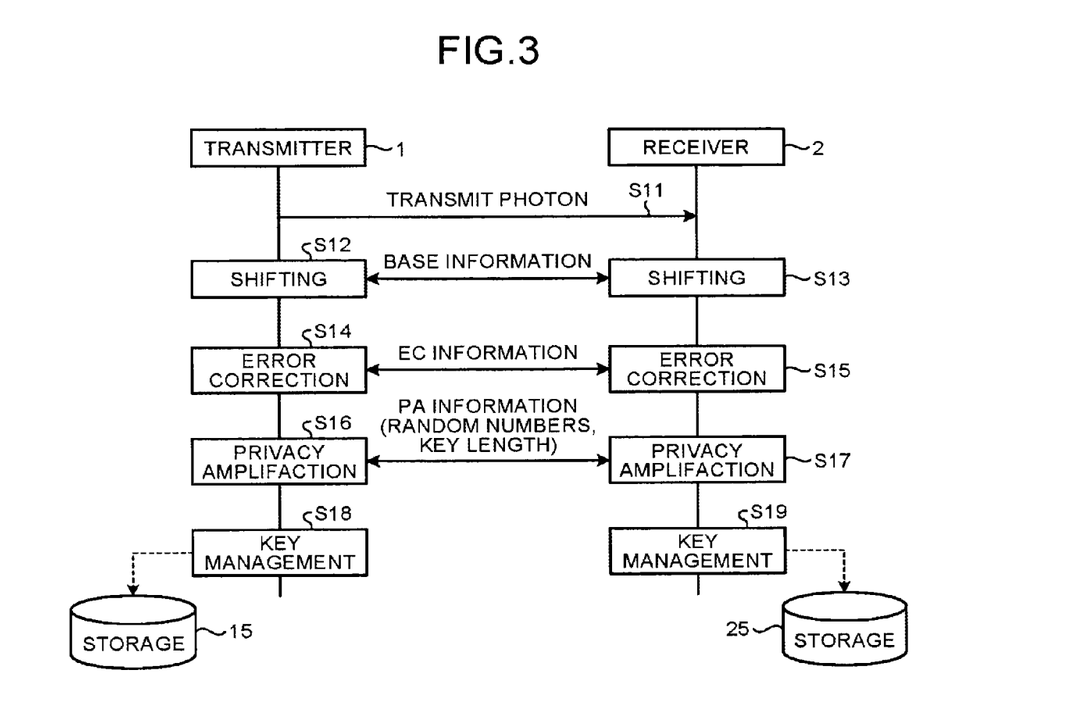
FIG. 3 is a sequence diagram illustrating an example of the operations performed during quantum key distribution and a key distillation process.
Figure 4:
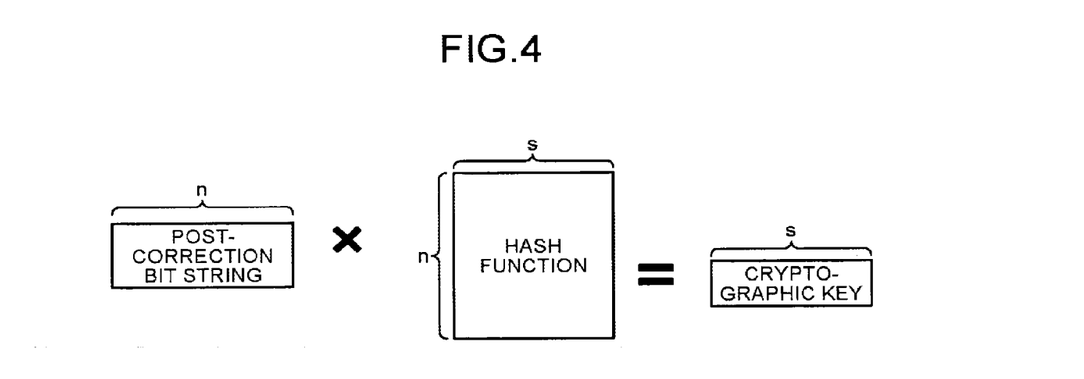
FIG. 4 is a diagram for explaining a key compression process.

FIG. 3 is a sequence diagram illustrating an example of the operations performed during quantum key distribution and the key distillation process. FIG. 4 is a diagram for explaining the key compression process. Thus, with reference to FIGS. 3 and 4, the explanation is given about quantum key distribution and the key distillation process performed by the transmitter 1 and the receiver 2.

Step S11

For example, the quantum key sharing unit 11 transmits, to the quantum key sharing unit 21 of the receiver 2 via the photon communication channel 30, a photon bit string that is made of single photons having the state based on base information generated in a random manner as against a bit string generated using random numbers. Thus, the quantum key sharing unit 21 receives, from the quantum key sharing unit 11 via the photon communication channel 30, a photon bit string and reads the photon bit string based on base information generated in a random manner.

Step S12

The quantum key sharing unit 11 receives, via the optical data communication channel 31, base information that is generated in a random manner by the quantum key sharing unit 21 for the purpose of reading the received photon bit strings. Subsequently, the quantum key sharing unit 11 compares the base information generated by itself with the base information received from the quantum key sharing unit 21, and performs a shifting process in which the bits corresponding to the matching portion are extracted from the photon bit string and treated as a shared bit string. Then, the quantum key sharing unit 11 transmits the shared bit string to the key distilling unit 12. Meanwhile, the shifting process explained herein is only exemplary, and it is possible to implement some other method too.

Step S13

The quantum key sharing unit 21 receives, via the optical data communication channel 31, the base information generated in a random manner by the quantum key sharing unit 11 for the purpose of transmitting the photon bit string. Moreover, the quantum key sharing unit 21 compares the base information generated by itself with the base information received from the quantum key sharing unit 11, and performs a shifting process in which the bits corresponding to the matching portion are extracted from the photon bit string and treated as a shared bit string. Then, the quantum key sharing unit 21 transmits the shared bit string to the key distilling unit 22. Meanwhile, the shifting process explained herein is only exemplary, and it is possible to implement some other method too.

Step S14

The key distilling unit 12 performs an error correction process that includes correcting the bit errors in the shared bit string based on the EC information exchanged with the key distilling unit 22 via the optical data communication channel 31, and generating a post-correction bit string. Herein, the post-correction bit string generated by the key distilling unit 12 matches with the post-correction bit string that is generated by the key distilling unit 22 (described below) by correcting the shared bit string.

Step S15

The key distilling unit 22 performs an error correction process that includes correcting the bit errors in the shared bit string based on the EC information exchanged with the key distilling unit 12 via the optical data communication channel 31, and generating a post-correction bit string. Herein, the post-correction bit string generated by the key distilling unit 22 matches with the post-correction bit string that is generated by the key distilling unit 12 by correcting the shared bit string.

Step S16

Based on the PA information received from the key distilling unit 22 via the optical data communication channel 31, the key distilling unit 12 performs a key compression process with respect to the post-correction bit string with the aim of cancelling out, from the number of corrected errors, the bits that are likely to have been tapped by a wiretapper during quantum key distribution and the error correction process; and generates a cryptographic key (a key bit string). More particularly, the key distilling unit 12 generates, as illustrated in FIG. 4, a hash function in the form of an n×s matrix from a length n of the post-correction bit string, the random numbers included in the PA information, and a length s of cryptographic keys. Then, the key distilling unit 12 multiplies the hash function to the post-correction bit string, and generates a cryptographic key (a key bit string) having the length s. Subsequently, the key distilling unit 12 transmits the generated cryptographic key to the key managing unit 13. Meanwhile, the method implemented for the key compression process is not limited to using the hash function as described above. That is, the key compression process can be performed using some other method too.

Step S17

The key distilling unit 22 generates PA information (random numbers and the length of cryptographic keys) and transmits it to the key distilling unit 12 via the optical data communication channel 31; and, based on that PA information, performs a key compression process with respect to the post-correction bit string with the aim of cancelling out, from the number of corrected errors, the bits that are likely to have been tapped by a wiretapper during quantum key distribution and the error correction process, and generates a cryptographic key (a key bit string). More particularly, the key distilling unit 22 performs the key compression process in an identical manner to the key distilling unit 12, and generates a cryptographic key (a key bit string). Then, the key distilling unit 22 transmits the generated cryptographic key to the key managing unit 13.

Step S18

The key managing unit 13 manages the cryptographic key (the key bit string), which is generated by the key distilling unit 12, by storing it in the storage 15. Then, as may be necessary, the key providing unit 14 obtains the cryptographic key from the storage 15 and provides it to an external application.

Step S19

The key managing unit 23 manages the cryptographic key (the key bit string), which is generated by the key distilling unit 22, by storing it in the storage 25. Then, as may be necessary, the key providing unit 24 obtains the cryptographic key from the storage 25 and provides it to an external application.

As a result of performing the operations described above, identical cryptographic keys are generated in the transmitter 1 and the receiver 2. As a result of repeating the operations described above, different cryptographic keys, which are to be shared between the transmitter 1 and the receiver 2, are generated in a repeated manner.

Figure 5:
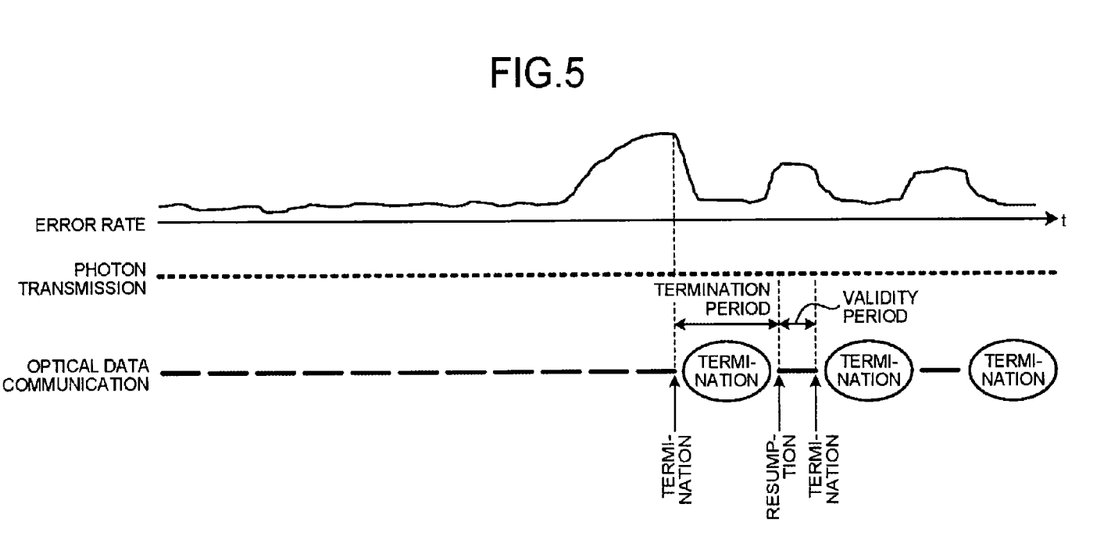
FIG. 5 is a diagram illustrating an example of the traffic flow according to a first embodiment.

FIG. 5 is a diagram illustrating an example of the traffic flow according to the first embodiment. Thus, with reference to FIG. 5, the explanation is given about the operations for controlling the communication function of the optical data communication in the optical data communication channel 31 (see FIG. 2).

In FIG. 5, the horizontal axis represents time; and the error rate in the photon communication channel 30, the state of photon transmission in the photon communication channel 30, and the state of optical data communication in the optical data communication channel 31 is illustrated. As described above, the communication function of the optical data communication in the optical data communication channel 31 is controlled by the communication function varying units 18 and 28. Moreover, the controllers 19 and 29 share error rate information regarding the errors occurring in the photon communication channel 30.

In the case in which the error rate of the photon communication channel 30 shared between the controllers 19 and 29 is in a favorable state, that is, in the case in which the error rate is smaller than a predetermined threshold value; the quantum key sharing units 11 and 21 perform quantum key distribution as usual via the photon communication channel 30, and the communication function varying units 18 and 28 instruct the optical data communicating units 16 and 26, respectively, to perform optical data communication as usual via the optical data communication channel 31. However, when the controllers 19 and 29 detect that the error rate of the photon communication channel 30 is equal or greater than the predetermined threshold value, the communication function varying units 18 and 28 instruct the optical data communicating units 16 and 26, respectively, to terminate (limit) the optical data communication being performed via the optical data communication channel 31. As a result, in the photon communication channel 30, there is a decline in the errors attributed to the optical noise in the optical data communication channel 31, thereby enabling achieving reduction in the error rate. Consequently, the generation of photon bit strings performed by the quantum key sharing units 11 and 21 by means of quantum key distribution can be brought back on track.

However, as a result of terminating the optical data communication, the communication throughput of the optical data communication decreases by necessity. Moreover, in the case in which the EC information and the PA information, which is used in the key distillation processes performed by the key distilling units 12 and 22, is transmitted and received via the optical data communication channel 31; the termination of the optical data communication may cause a decline in the rate at which cryptographic keys are eventually generated (hereinafter, called a secure bit rate).

However, generally, the key distillation process (the error correction process and the privacy amplification process) is more prone to having operation load bottlenecks as compared to the volume of communication data. For that reason, if the termination condition and the termination period for optical data communication are appropriately set, then it becomes possible to reduce the effect of the termination of the optical data communication on the secure bit rate.

Given below is the detailed explanation of the termination condition for optical data communication in the optical data communication channel 31. As described above, if the controllers 19 and 29 detect that the error rate of the photon communication channel 30 is equal or greater than a predetermined threshold value; then, as illustrated in FIG. 5, the communication function varying units 18 and 28 instruct the optical data communicating units 16 and 26, respectively, to terminate the optical data communication being performed via the optical data communication channel 31. In this case, as far as the error rate measured by the controller 29 is concerned, it is possible to use either the instantaneous value or the average value over a predetermined period of time. Meanwhile, alternatively, the configuration can be such that, when the controllers 19 and 29 detect that the instantaneous value of the error rate is equal to or greater than the predetermined threshold value, the abovementioned existing feedback control is performed; and then, if the average value of the error rate is detected to be equal to or greater than the predetermined threshold value, the communication function varying units 18 and 28 terminate the optical data communication. Still alternatively, the configuration can be such that, when the controllers 19 and 29 detect that the error rate (the instantaneous value or the average value) is equal to or greater than the predetermined threshold value, the existing feedback control is performed for a predetermined period of time as the initial response; and, if the error rate (the instantaneous value or the average value) still remains equal to or greater than the predetermined threshold value, the communication function varying units 18 and 28 terminate the optical data communication.

Given below is the explanation of the method of terminating the optical data communication in the optical data communication channel 31. As far as the method of terminating the optical data communication is concerned, for example, it is possible to think of a method in which the communication function varying units 18 and 28 respectively disable the optical data communicating units 16 and 26 serving as network interfaces, and buffer the to-be-transmitted data in the buffers of the optical data communicating units 16 and 26, respectively.

Given below is the explanation about the termination period (limiting period) for optical data communication in the optical data communication channel 31. In response to the fact that the error rate of the photon communication channel 30 is equal to or greater than the predetermined threshold value, the communication function varying units 18 and 28 terminate the optical data communication for, for example, a period of time explained below. The transmission of a photon bit string, which is made of single photons, by the quantum key sharing unit 11 to the receiver 2 is usually performed in units of a predetermined size (block size). Accordingly, the communication function varying units 18 and 28 set, as the termination period for optical data communication, the period of time taken by the quantum key sharing unit 11 to completely transmit the photon bit string having the predetermined block size via the photon communication channel 30. With that, during the period of time in which the quantum key sharing unit 11 transmits the photon bit string having the predetermined block size, it becomes possible to eliminate the errors in the photon communication channel 30 and to transmit photon bit strings having the predetermined block size at a low error rate. As a result, the photon bit strings having the predetermined block size become more likely to be usable in generating cryptographic keys.

Alternatively, the termination period after the termination of the optical data communication by the communication function varying units 18 and 28 can be set to a period of time in which the data to be transmitted can be buffered in the buffers of the optical data communicating units 16 and 26.

Still alternatively, the termination period after the termination of the optical data communication by the communication function varying units 18 and 28 can simply be set to the period of time till the controllers 19 and 29 detect that the error rate of the photon communication channel 30 is smaller than the predetermined threshold value. With that, the optical data communication in the photon communication channel 30 can be resumed after achieving reduction in the errors attributed to the noise caused by the optical data communication. Moreover, in this case, the threshold value with respect to the error rate at which the communication function varying units 18 and 28 terminate the optical data communication can be different than the threshold value with respect to the error rate at which the communication function varying units 18 and 28 resume the optical data communication.

After the elapse of the termination period for optical data communication; as illustrated in FIG. 5, the communication function varying units 18 and 28 instruct the optical data communicating units 16 and 26, respectively, to resume (release the limitation on) the optical data communication via the optical data communication channel 31.

Given below is the explanation about the validity period of the optical data communication after it is resumed in the optical data communication channel 31 (see FIG. 5). Firstly, the explanation is given about a case in which the base information used in the shifting processes performed by the quantum key sharing units 11 and 21 as well as the EC information and the PA information used in the key distillation processes performed by the key distilling units 12 and 22 is communicated via the optical data communication channel 31 or a case in which either the base information or the EC information and the PA information is communicated via the optical data communication channel 31. Upon instructing the optical data communicating units 16 and 26, respectively, to resume the optical data communication, the communication function varying units 18 and 28 set the optical data communication to a valid state for at least a period of time explained below. Herein, the communication function varying units 18 and 28 set the valid state for optical data communication to a period of time till the base information used in the shifting processes performed by the quantum key sharing units 11 and 21 as well as the EC information and the PA information used in the key distillation processes performed by the key distilling units 12 and 22 is communicated via the optical data communication channel 31 or till either the base information or the EC information and the PA information is communicated via the optical data communication channel 31. With that, after the completion of the key distillation processes, the transmitter 1 and the receiver 2 can continuously perform the optical data communication till the process for sharing a single cryptographic key is completed. That enables achieving efficiency from the perspective of the secure bit rate.

Alternatively, as the validity period after the resumption of the optical data communication, the communication function varying units 18 and 28 can simply set the period of time till the controllers 19 and 29 detect that the error rate of the photon communication channel 30 is equal to or greater than the predetermined threshold value.

Meanwhile, the optical data communication is performed in two directions, namely, the direction from the transmitter 1 to the receiver 2 and the direction from the receiver 2 to the transmitter 1. The communication in these two directions can be terminated and resumed in a synchronized manner or in a non-synchronized manner. Alternatively, termination and resumption of communication can be implemented with respect to the optical data communication in only one direction. Moreover, the control can be performed in such a way that the direction of communication in which the control data used in the key distillation process is communicated more frequently can be enabled for a longer period of time.

Meanwhile, in the case in which cryptographic key sharing between the transmitter 1 and the receiver 2 is performed to a sufficient extent and in which the number of cryptographic keys stored in the storages 15 and 25 is greater than the number of cryptographic keys required by an application that makes use of cryptographic keys; the configuration can be such that the optical data communication is not terminated even if the error rate undergoes an increase. As a result, although there is a possibility of a decline in the number of photon bit strings generated via the photon communication channel 30, a sufficient number of cryptographic keys prevents any issue from arising, thereby making it possible to continue with the data communication via the optical data communication channel 31.

Second Embodiment

The operations performed in a communication system according to a second embodiment are explained with a focus on the differences in the configuration and operations with the communication system 100 according to the first embodiment. Herein, the configuration of the communication system according to the second embodiment as well as the configuration of a quantum key distribution network including that communication system is identical to the first embodiment. Moreover, the quantum key distribution and the key distillation process performed in the communication system according to the second embodiment are identical to the first embodiment.

Firstly, explained below with reference to FIG. 2 are the differences in the operations of each functional component as compared to the first embodiment. The optical data communicating unit 16 is an interface device that performs optical data communication with the receiver 2 (the optical data communicating unit 26) via the optical data communication channel 31. Moreover, as described later, the optical data communicating unit 16 controls the communication throughput of the optical data communication in response to a command issued by the communication function varying unit 18. For that reason, the optical data communicating unit 16 includes a buffer (not illustrated) for buffering the data, which is to be transmitted to the receiver 2, while the communication throughput of the optical data communication is limited.

The communication function varying unit 18 (a communication function varying unit) is a functional component that controls the communication function of the optical data communication in the optical data communication channel 31. Based on the error rate of the errors occurring in the photon communication channel 30, the communication function varying unit 18 instructs the optical data communicating unit 16 to limit the communication throughput of the optical data communication in the optical data communication channel 31. Regarding the communication throughput decline condition of the optical data communication, the communication throughput time limit of the optical data communication, and the normal operation period for the communication throughput of the optical data communication; the detailed explanation is given later.

The optical data communicating unit 26 is an interface device that performs optical data communication with the transmitter 1 (the optical data communicating unit 16) via the optical data communication channel 31. Moreover, as described later, the optical data communicating unit 26 controls the communication throughput of the optical data communication in response to a command issued by the communication function varying unit 28. For that reason, the optical data communicating unit 26 includes a buffer (not illustrated) for buffering the data, which is to be transmitted to the transmitter 1, while the communication throughput of the optical data communication is limited.

The communication function varying unit 28 (a communication function varying unit) is a functional component that controls the communication function of the optical data communication in the optical data communication channel 31. Based on the error rate of the errors occurring in the photon communication channel 30, the communication function varying unit 28 instructs the optical data communicating unit 26 to limit the communication throughput of the optical data communication in the optical data communication channel 31. Regarding the communication throughput decline condition of the optical data communication, the communication throughput time limit of the optical data communication, and the normal operation period for the communication throughput of the optical data communication; the detailed explanation is given later.

Figure 6:
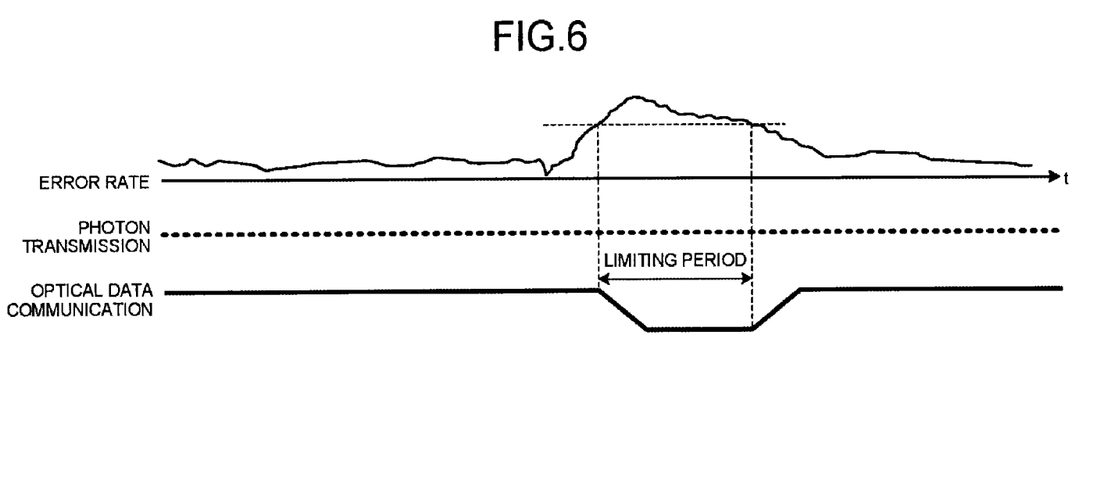
FIG. 6 is a diagram illustrating an example of the traffic flow according to a second embodiment.

FIG. 6 is a diagram illustrating an example of the traffic flow according to the second embodiment. Thus, with reference to FIG. 6, the explanation is given about the operations for controlling the communication function of the optical data communication in the optical data communication channel 31 (see FIG. 2).

In FIG. 6, the horizontal axis represents time; and the error rate in the photon communication channel 30, the state of photon transmission in the photon communication channel 30, and the state of optical data communication in the optical data communication channel 31 is illustrated. As described above, the communication function of the optical data communication in the optical data communication channel 31 is controlled by the communication function varying units 18 and 28. Moreover, the controllers 19 and 29 share error rate information regarding the errors occurring in the photon communication channel 30.

In the case in which the error rate of the photon communication channel 30 shared between the controllers 19 and 29 is in a favorable state, that is, in the case in which the error rate is smaller than a predetermined threshold value; the quantum key sharing units 11 and 21 perform quantum key distribution as usual via the photon communication channel 30, and the communication function varying units 18 and 28 instruct the optical data communicating units 16 and 26, respectively, to perform optical data communication via the optical data communication channel 31 at the usual communication throughput (for example, at the maximum communication throughput). However, when the controllers 19 and 29 detect that the error rate of the photon communication channel 30 is equal or greater than the predetermined threshold value, the communication function varying units 18 and 28 instruct the optical data communicating units 16 and 26, respectively, to reduce (limit) the communication throughput of the optical data communication being performed via the optical data communication channel 31. As a result, in the photon communication channel 30, there is a decrease in the errors attributed to the optical noise in the optical data communication channel 31, thereby enabling achieving reduction in the error rate. Consequently, the generation of photon bit strings performed by the quantum key sharing units 11 and 21 by means of quantum key distribution can be brought back on track.

However, as a result of a decline in the optical throughput of the optical data communication, the volume of communication data in the optical data communication channel 31 decreases by necessity. Moreover, in the case in which the EC information and the PA information, which is used in the key distillation processes performed by the key distilling units 12 and 22, is transmitted and received via the optical data communication channel 31; the decline in the communication throughput of the optical data communication may also cause a decline in the secure bit rate. However, generally, the key distillation process (the error correction process and the privacy amplification process) is more prone to having operation load bottlenecks as compared to the volume of communication data. For that reason, if the communication throughput decline condition of the optical data communication and the communication throughput time limit of the optical data communication are appropriately set, it becomes possible to reduce the effect of the limitation in the optical data communication on the secure bit rate.

Given below is the detailed explanation of the communication throughput decline condition of the optical data communication in the optical data communication channel 31. As described above, if the controllers 19 and 29 detect that the error of the photon communication channel 30 is equal to or greater than the predetermined threshold value; then, as illustrated in FIG. 6, the communication function varying units 18 and 28 instruct the optical data communicating units 16 and 26, respectively, to reduce the communication throughput of the optical data communication performed via the optical data communication channel 31. In this case, as far as the error rate measured by the controller 29 is concerned, it is possible to use either the instantaneous value or the average value over a predetermined period of time. Meanwhile, alternatively, the configuration can be such that, when the controllers 19 and 29 detect that the instantaneous value of the error rate is equal to or greater than the predetermined threshold value, the abovementioned existing feedback control is performed; and then, if the average value of the error rate is detected to be equal to or greater than the predetermined threshold value, the communication function varying units 18 and 28 reduce the communication throughput of the optical data communication. Still alternatively, the configuration can be such that, when the controllers 19 and 29 detect that the error rate (the instantaneous value or the average value) is equal to or greater than the predetermined threshold value, the existing feedback control is performed for a predetermined period of time as the initial response; and, if the error rate (the instantaneous value or the average value) still remains equal to or greater than the predetermined threshold value, the communication function varying units 18 and 28 reduce the communication throughput of the optical data communication.

Given below is the explanation about the method of limiting the communication throughput of the optical data communication in the optical data communication channel 31. As far as the method for limiting the communication throughput of the optical data communication is concerned; for example, if a plurality of optical data communication channels (a plurality of usable wavelengths) is formed by the wavelength multiplexing processors 10 and 20 for performing optical data communication, the communication function varying units 18 and 28 can reduce the communication throughput of the optical data communication by reducing the number of optical data communication channels. Alternatively, the communication function varying units 18 and 28 can reduce the communication throughput of the optical data communication by implementing the existing traffic shaping technology. Still alternatively, the communication function varying units 18 and 28 can reduce the communication throughput of the optical data communication by switching the communication protocol, which is used in the optical data communication, from a fast protocol (a second protocol) to a slow protocol (a first protocol).

Given below is the explanation of a specific example of the operations performed to control the communication throughput of the optical data communication in the optical data communication channel 31. As described above, if the controllers 19 and 29 detect that the error rate of the photon communication channel 30 is equal to or greater than the predetermined threshold value; then, as illustrated in FIG. 6, the communication function varying units 18 and 28 instruct the optical data communicating units 16 and 26, respectively, to gradually reduce the communication throughput of the optical data communication performed via the optical data communication channel 31. In this case, it is desirable to set a lower limit of the communication throughput. That lower limit of the communication throughput can be set to zero too. In that case, it is possible to achieve the effect according to the first embodiment. Alternatively, the lower limit of the communication throughput can be set to a value other than zero. Then, in the state in which the communication throughput of the optical data communication is decreasing or has reached the lower limit; if the controllers 19 and 29 detect that the error rate has fallen below the predetermined threshold value, then the communication function varying units 18 and 28 instruct the optical data communicating units 16 and 26 to gradually increase the communication throughput as illustrated in FIG. 6. As a result, while the error rate is smaller than the threshold value, it becomes possible to achieve the fastest communication throughput under that condition. Meanwhile, herein, the communication function varying units 18 and 28 gradually reduce and gradually increase the communication throughput of the optical data communication in the optical data communication channel 31. However, in the case in which the communication throughput of the optical data communication is switched from the normal state to the limited state or is switched from the limited state to the normal state, the communication throughput of the optical data communication can be varied in a discontinuous manner.

Given below is the explanation about the limiting period for the communication throughput of the optical data communication in the optical data communication channel 31. Herein, the limiting period points to a period of time from the start time of a decline in the communication throughput of the optical data communication to the start time of an increase in the communication throughput of the optical data communication. After starting to reduce the communication throughput of the optical data communication due to the fact that the error rate of the photon communication channel 30 is equal to or greater than the predetermined threshold value, the communication function varying units 18 and 28 limit the communication throughput of the optical data communication for, for example, a period of time explained below. The transmission of a photon bit string, which is made of single photons, by the quantum key sharing unit 11 to the receiver 2 is usually performed in units of a predetermined size (block size). Accordingly, the communication function varying units 18 and 28 set, as the limiting period for the communication throughput of the optical data communication, the period of time taken by the quantum key sharing unit 11 to completely transmit the photon bit string having the predetermined block size via the photon communication channel 30. With that, during the period of time in which the quantum key sharing unit 11 transmits the photon bit string having the predetermined block size, it becomes possible to reduce the errors in the photon communication channel 30 and to transmit the photon bit strings having the predetermined block size at a low error rate. As a result, the photon bit strings having the predetermined block size become more likely to be usable in generating cryptographic keys.

Alternatively, the limiting period after the communication function varying units 18 and 28 start reducing the communication throughput of the optical data communication can be set to a period of time in which the data to be transmitted can be buffered in the buffers of the optical data communicating units 16 and 26.

Still alternatively, the limiting period after the communication function varying units 18 and 28 start reducing the communication throughput of the optical data communication can simply be set to the period of time till the controllers 19 and 29 detect that the error rate of the photon communication channel 30 is smaller than the predetermined threshold value. With that, the optical data communication in the photon communication channel 30 can be resumed after achieving reduction in the errors attributed to the noise caused by the optical data communication. Moreover, in this case, the threshold value with respect to the error rate at which the communication function varying units 18 and 28 reduce the communication throughput of the optical data communication can be different than the threshold value with respect to the error rate at which the communication function varying units 18 and 28 increase the communication throughput of the optical data communication.

After the elapse of the abovementioned limiting period for the communication throughput of the optical data communication; as illustrated in FIG. 6, the communication function varying units 18 and 28 instruct the optical data communicating units 16 and 26, respectively, to increase (release the limitation on) the communication throughput of the optical data communication via the optical data communication channel 31.

Given below is the explanation about a normal operation period (a validity period) for the communication throughput of the optical data communication in the optical data communication channel 31. Herein, it is assumed that the base information used in the shifting processes performed by the quantum key sharing units 11 and 21 as well as the EC information and the PA information used in the key distillation processes performed by the key distilling units 12 and 22 is communicated via the optical data communication channel 31 or it is assumed that either the base information or the EC information and the PA information is communicated via the optical data communication channel 31. Upon instructing the optical data communicating units 16 and 26, respectively, to return the communication throughput of the optical data communication to the normal state, the communication function varying units 18 and 28 maintain the communication throughput of the optical data communication in the normal state for at least a period of time explained below. Herein, the communication function varying units 18 and 28 set the normal operation period for the communication throughput of the optical data communication to a period of time till the base information used in the shifting processes performed by the quantum key sharing units 11 and 21 as well as the EC information and the PA information used in the key distillation processes performed by the key distilling units 12 and 22 is communicated via the optical data communication channel 31 or till either the base information or the EC information and the PA information is communicated via the optical data communication channel 31. With that, after the completion of the key distillation processes, the transmitter 1 and the receiver 2 can continuously perform the optical data communication till the operation for sharing a single cryptographic key is completed. That enables achieving efficiency from the perspective of the secure bit rate.

Alternatively, the normal operation period after the return of the communication throughput of the optical data communication to the normal state by the communication function varying units 18 and 28 can simply be set to the period of time till the controllers 19 and 29 detect that the error rate of the photon communication channel 30 is equal to or greater than the predetermined threshold value.

Meanwhile, the optical data communication is performed in two directions, namely, the direction from the transmitter 1 to the receiver 2 and the direction from the receiver 2 to the transmitter 1. The communication in these two directions can be subjected to communication throughput limitation in a synchronized manner or in a non-synchronized manner. Alternatively, communication throughput limitation can be applied to the optical data communication in only one direction. Moreover, the control can be performed in such a way that the direction of communication in which the control data used in the key distillation process is communicated more frequently can have the communication throughput in the normal state for a longer period of time.

Meanwhile, in the case in which cryptographic key sharing between the transmitter 1 and the receiver 2 is performed to a sufficient extent and in which the number of cryptographic keys stored in the storages 15 and 25 is greater than the number of cryptographic keys required by an application that makes use of cryptographic keys; the configuration can be such that the communication throughput of the optical data communication is not limited even if the error rate undergoes an increase. As a result, although there is a possibility of a decline in the number of photon bit strings generated via the photon communication channel 30, a sufficient number of cryptographic keys prevents any issue from arising, thereby making it possible to continue with the data communication via the optical data communication channel 31 at the normal communication throughput.

Third Embodiment

The operations performed in a communication system according to a third embodiment are explained with a focus on the differences in the configuration and operations with the communication system according to the first and second embodiments. Herein, the configuration of the communication system according to the third embodiment as well as the configuration of a quantum key distribution network including that communication system is identical to the first embodiment. Moreover, the quantum key distribution and the key distillation process performed in the communication system according to the second embodiment are identical to the first embodiment.

Firstly, explained below with reference to FIG. 2 are the differences in the operations of each functional component as compared to the first embodiment. The optical data communicating unit 16 is an interface device that performs optical data communication with the receiver 2 (the optical data communicating unit 26) via the optical data communication channel 31. Moreover, the optical data communication unit 16 controls the optical output intensity of the optical data communication channel 31 in response to a command issued by the communication function varying unit 18. For that reason, the optical data communicating unit 16 includes a buffer (not illustrated) for buffering the data, which is to be transmitted to the receiver 2, while the optical output intensity of the optical data communication channel 31 is on a decline.

The communication function varying unit 18 (a communication function varying unit) is a functional component that controls the communication function of the optical data communication in the optical data communication channel 31. Based on the error rate of the errors occurring in the photon communication channel 30, the communication function varying unit 18 instructs the optical data communicating unit 16 to limit the optical output intensity of the optical data communication channel 31.

The optical data communicating unit 26 is an interface device that performs optical data communication with the transmitter 1 (the optical data communicating unit 16) via the optical data communication channel 31. Moreover, the optical data communicating unit 26 controls the optical output intensity of the optical data communication channel 31 in response to a command issued by the communication function varying unit 28. For that reason, the optical data communicating unit 26 includes a buffer (not illustrated) for buffering the data, which is to be transmitted to the transmitter 1, while the optical output intensity of the optical data communication channel 31 is on a decline.

The communication function varying unit 28 (a communication function varying unit) is a functional component that controls the communication function of the optical data communication in the optical data communication channel 31. Based on the error rate of the errors occurring in the photon communication channel 30, the communication function varying unit 28 instructs the optical data communicating unit 26 to limit the optical output intensity of the optical data communication channel 31.

In the third embodiment, the decline condition for the optical output intensity of the optical data communication channel 31, the control operation of the optical output intensity, the limiting period of the optical output intensity, and the normal operation period (the validity period) of the optical output intensity are respectively identical to the communication throughput decline condition of the optical data communication, the control operation of the communication throughput of the optical data communication, the limiting period for the communication throughput of the optical data communication, and the normal operation period for the communication throughput of the optical data communication according to the second embodiment.

Depending on the limiting operation of the optical output intensity of the optical data communication channel 31, the communication throughput of the optical data communication does not change in principle. However, for example, as a result of reducing the optical output intensity, the error rate in the optical data communication channel 31 increases. For that reason, there arises a need to change the error correction code into a stronger code thereby leading to a possibility of a decline in the communication throughput of the optical data communication. However, as described above, if the decline condition, the control operation, the limiting period, and the normal operation period are appropriately set with respect to the optical output intensity of the optical data communication channel 31, it becomes possible to achieve the same effect as the effect achieved in the second embodiment.

Figure 7:
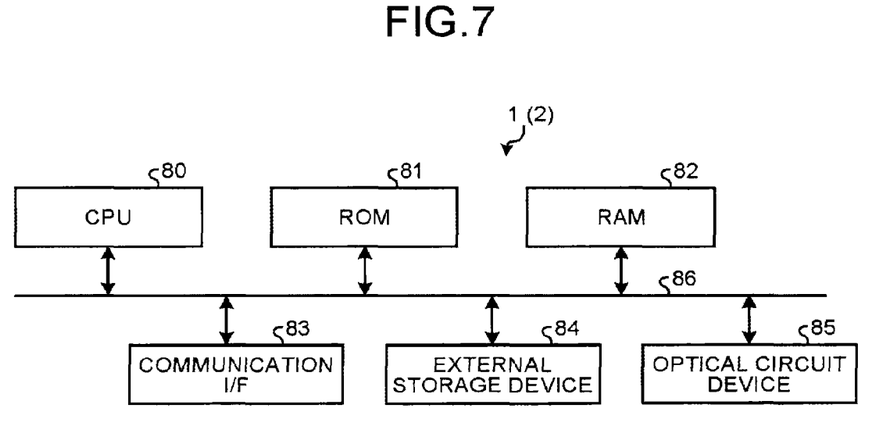
FIG. 7 is a diagram illustrating an exemplary hardware configuration of the transmitter and the receiver.

FIG. 7 is a diagram illustrating an exemplary hardware configuration of the transmitter and the receiver. Thus, a hardware configuration of the communication device according to the embodiments described above is explained below with reference to FIG. 7.

The communication device according to the embodiments includes a control device such as the CPU 80; a read only memory (ROM) 81; a random access memory (RAM) 82; a first communication I/F 83 that performs photon transmission and photon reception as well as performs optical data communication; an external storage device 84 that serves as the storage for storing cryptographic keys; an optical circuit device 85 that is used in implementing some of the functions of the quantum key sharing unit 11 (or the quantum key sharing unit 21); and a bus 86 that connects the constituent elements to each other.

The computer programs executed in the communication device according to the embodiments are stored in advance in the ROM 81.

Alternatively, the computer programs executed in the communication device according to the embodiments can be recorded as installable or executable files in a computer-readable recording medium such as a compact disk read only memory (CD-ROM), a flexible disk (FD), a compact disk recordable (CD-R), or a digital versatile disk (DVD); and can be provided in the form of a computer program product.

Still alternatively, the computer programs executed in the communication device according to the embodiments can be saved as downloadable files on a computer connected to the Internet or can be made available for distribution through a network such as the Internet.

The computer programs executed in the communication device according to the embodiments can cause a computer to function as the constituent elements of the communication device (i.e., function as the wavelength multiplexing processor 10, the quantum key sharing unit 11, the key distilling unit 12, the key managing unit 13, the key providing unit 14, the synchronization controller 17, the communication function varying unit 18, the controller 19, the wavelength multiplexing processor 20, the quantum key sharing unit 21, the key distilling unit 22, the key managing unit 23, the key providing unit 24, the synchronization controller 27, a communication function varying unit 28, and the controller 29). In this computer, the CPU 80 can read the computer programs from a computer-readable memory medium, load them into a main storage device, and execute them.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication device connected to another communication device through an optical communication path to generate an identical cryptographic key shared among the communication devices, the optical communication path including a photon communication channel for transmitting and receiving a photon string and an optical data communication channel for performing optical data communication, the optical data communication channel being different from the photon communication channel, the communication device comprising:
   a hardware processor configured to function as:
   a quantum key sharing unit configured to generate a shared bit string through quantum key distribution with the another communication device via the optical communication path;
   a key distilling unit configured to generate the cryptographic key from the shared bit string by performing a key distillation process;
   a measuring unit configured to measure an error rate of an error occurring in the photon string transmitted and received via the photon communication channel, the error being caused by, at least, the optical data communication via the optical data communication channel; and
   a communication function varying unit configured to vary, based on the error rate, a communication function by applying a limitation on a volume of communication data of the optical data communication through the optical data communication channel or by releasing the limitation.

2. The communication device according to claim 1, wherein the communication function varying unit is configured to terminate the optical data communication to apply the limitation and resume the optical data communication to release the limitation.

3. The communication device according to claim 1, wherein the communication function varying unit is configured to reduce a communication throughput of the optical data communication to apply the limitation and increase the communication throughput to release the limitation.

4. The communication device according to claim 3, wherein
   the optical communication path includes a plurality of optical data communication channels, and
   the communication function varying unit is configured to reduce the number of optical data communication channels to reduce the communication throughput and increase the number of optical data communication channels to increase the communication throughput.

5. The communication device according to claim 3, wherein the communication function varying unit is configured to change a communication protocol of the optical data communication to a first protocol to reduce the communication throughput and change the communication protocol of the optical data communication to a second protocol that is faster than the first protocol to increase the communication throughput.

6. The communication device according to claim 1, wherein the communication function varying unit is configured to reduce an optical output intensity of the optical data communication to apply the limitation and increase the optical output intensity to release the limitation.

7. The communication device according to claim 1, wherein the communication function varying unit is configured to apply the limitation on the optical data communication when the measuring unit detects that the measured error rate is equal to or greater than a first threshold value.

8. The communication device according to claim 1, wherein the communication function varying unit is configured to set a limiting period during which the limitation is applied on the optical data communication, to a period of time till the photon string of a predetermined size is completely transmitted or received by the quantum key sharing unit via the photon communication channel.

9. The communication device according to claim 1, wherein the communication function varying unit is configured to set a limiting period during which the limitation is applied on the optical data communication, to a period of time till the measuring unit detects that the measured error rate is equal to or smaller than a second threshold value.

10. The communication device according to claim 1, wherein the communication function varying unit is configured to set a validity period that is a period of time after releasing the limitation on the optical data communication, to a period of time till at least the quantum key sharing unit and the key distilling unit generate the cryptographic key in singularity.

11. The communication device according to claim 1, further comprising a storage configured to store the cryptographic key, wherein
   the communication function varying unit is configured not to apply the limitation on the optical data communication regardless of magnitude of the error rate when the number of cryptographic keys stored in the storage is greater than the number of cryptographic keys required by an application that makes use of the cryptographic keys.

12. The communication device according to claim 1, further comprising a storage configured to store the cryptographic key, wherein
   the communication function varying unit is configured to apply the limitation on the optical data communication when the number of cryptographic keys stored in the storage is smaller than the number of cryptographic keys required by an application that makes use of the cryptographic keys.

13. A communication system comprising a plurality of communication devices each corresponding to the communication device according to claim 1, wherein
   at least one of the plurality of communication devices is connected by the optical communication path.

14. A communication method implemented in a communication device connected to another communication device through an optical communication path to generate an identical cryptographic key shared among the communication devices, the optical communication path including a photon communication channel for transmitting and receiving a photon string and an optical data communication channel for performing optical data communication, the optical data communication channel being different from the photon communication channel, the communication method comprising:
   generating a shared bit string through quantum key distribution with the another communication device via the optical communication path;
   generating the cryptographic key from the shared bit string by performing a key distillation process;
   measuring an error rate of an error occurring in the photon string transmitted and received via the photon communication channel, the error being caused by, at least, the optical data communication via the optical data communication channel; and varying, based on the error rate, a communication function by applying a limitation on a volume of communication data of the optical data communication through the optical data communication channel or by releasing the limitation.

* * * * *